US009398099B2

(12) United States Patent
Fujisawa (10) Patent No.: US 9,398,099 B2
(45) Date of Patent: Jul. 19, 2016

(54) INFORMATION PROCESSING APPARATUS FOR EXECUTING PROCESSING IN RESPONSE TO REQUEST FROM EXTERNAL DEVICE, CONTROL METHOD OF INFORMATION PROCESSING APPARATUS, AND STORAGE MEDIUM (75) Inventor: Kunimasa Fujisawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 312 days.

(21) Appl. No.: 13/236,261

(22) Filed: Sep. 19, 2011

(65) Prior Publication Data
US 2012/0072557 A1 Mar. 22, 2012

(30) Foreign Application Priority Data
Sep. 22, 2010 (JP) ................................. 2010-212396

(51) Int. Cl.
*G06F 15/177* (2006.01)
*H04L 29/08* (2006.01)
*H04N 1/00* (2006.01)
*G06F 21/31* (2013.01)
(Continued)

(52) U.S. Cl.
CPC .......... *H04L 67/146* (2013.01); *H04L 63/0428* (2013.01); *H04L 63/08* (2013.01); *H04L 63/12* (2013.01); *H04N 1/00217* (2013.01); *H04N 1/00222* (2013.01); *G06F 3/1288* (2013.01); *G06F 21/31* (2013.01); *H04L 63/20* (2013.01); *H04L 67/02* (2013.01); *H04N 2201/0075* (2013.01); *H04N 2201/0094* (2013.01); *H04N 2201/3202* (2013.01); *H04N 2201/3205* (2013.01)

(58) Field of Classification Search
CPC ..... H04L 63/08; H04L 67/20; H04L 63/0428; H04L 63/12; H04L 63/20; H04L 67/146; G06F 21/31; G06F 3/1288
USPC ........................................................ 709/220
See application file for complete search history.

(56) References Cited

U.S. PATENT DOCUMENTS 6,711,618 B1 * 3/2004 Danner ................... H04L 29/06 704/E15.044
6,961,330 B1 * 11/2005 Cattan ..................... H04L 29/06 370/352

(Continued)

FOREIGN PATENT DOCUMENTS

CN 1988585 A 6/2007
CN 101237499 A 8/2008
(Continued)

*Primary Examiner* — Oleg Survillo
(74) *Attorney, Agent, or Firm* — Canon USA Inc. IP Division (57) ABSTRACT An information processing apparatus includes a generation unit configured to generate a first identifier and a second identifier for identifying an external device, a storage unit configured to store the generated first and second identifiers in association with each other, a first processing unit configured to execute processing based on a received first processing request, a transmission unit configured to transmit the first identifier together with a processing result of the first processing unit to the external device, and a second processing unit configured to, if a reception unit receives a second processing request including the first identifier transmitted from the transmission unit, identify the external device by the second identifier corresponding to the first identifier, and execute the processing based on the second processing request.

10 Claims, 8 Drawing Sheets (51) Int. Cl.
*H04L 29/06* (2006.01)
*G06F 3/12* (2006.01)

(56) References Cited

U.S. PATENT DOCUMENTS

| | | | | |
|---|---|---|---|---|
| 7,694,335 B1* | 4/2010 | Turner | ................ | H04L 63/1441 708/250 |
| 8,051,465 B1* | 11/2011 | Martin | ................... | G06F 21/00 726/3 |
| 8,689,345 B1* | 4/2014 | Martin et al. | ................... | 726/26 |
| 8,856,869 B1* | 10/2014 | Brinskelle | ............... | H04L 63/08 726/12 |
| 9,003,540 B1* | 4/2015 | Johansson | ........... | H04L 63/0807 713/170 |
| 2002/0099936 A1* | 7/2002 | Kou et al. | .................... | 713/151 |
| 2004/0117486 A1* | 6/2004 | Bourne | ............. | G06F 17/30902 709/228 |
| 2006/0230265 A1* | 10/2006 | Krishna | ................. | H04L 63/08 713/158 |
| 2007/0159663 A1* | 7/2007 | Tsujimoto | ..................... | 358/448 |
| 2008/0056494 A1* | 3/2008 | Jacobson et al. | ............. | 380/255 |
| 2008/0150952 A1* | 6/2008 | Koarai | .......................... | 345/531 |
| 2011/0087754 A1* | 4/2011 | Cansino et al. | ............... | 709/217 |
| 2013/0050735 A1* | 2/2013 | Nuggehalli et al. | ......... | 358/1.13 |
| 2013/0275425 A1* | 10/2013 | Kelly et al. | .................. | 707/731 |

FOREIGN PATENT DOCUMENTS

| | | |
|---|---|---|
| CN | 101542440 A | 9/2009 |
| EP | 2040165 A2 * | 3/2009 |
| JP | 2009-140163 A | 6/2009 |

* cited by examiner

INFORMATION PROCESSING APPARATUS FOR EXECUTING PROCESSING IN RESPONSE TO REQUEST FROM EXTERNAL DEVICE, CONTROL METHOD OF INFORMATION PROCESSING APPARATUS, AND STORAGE MEDIUM

BACKGROUND OF THE INVENTION

1. Field of the Invention

The present invention relates to an information processing apparatus that executes processing in response to a request from an external device.

2. Description of the Related Art

Recently, a multifunction peripheral (MFP) having a copy function or a print function has included a web server function for performing various processing in communication with an external device on a network. The MFP having the web server function can receive a processing request according to a hypertext transfer protocol (HTTP) from the external device, execute processing according to the received processing request, and transmit the processing result to the external device. For example, when receiving a request for obtaining a processing status (indicating whether a job is executed) of the MFP from the external device, the MFP sends its own status as a response to the external device. Alternatively, when receiving a request of print processing from the external device, the MFP perform printing in response to the received request, and sends a processing result as a response to the external device.

In general, an application operating on an HTTP server manages an identifier for identifying a communication status with the external device using a Cookie. The identifier managed by the Cookie can be used to determine whether a request is from a specific external device, or determine whether the external device has issued a request once to perform a sequel to processing with respect to the previous request according to the determination result. Further, the identifier can be used to authenticate the external device.

For example, when the external device on the network requests processing to an application operating on the HTTP server, the application operating on the HTTP server generates an identifier for identifying the external device as a session identification (ID). Further, the application transmits the session ID to the external device together with a result of the processing request. When requesting processing again to the application operating on the HTTP server, the external device transmits the processing request together with the session ID received from the MFP. As a consequence, the MFP can recognize the processing request from the same external device, and execute processing based on the session ID.

An MFP is generally known, which is loaded with an application operating on a hypertext transfer protocol secure (HTTPS) server formed by adding a security function to an HTTP server (an HTTP server that communicates with an HTTP client by encrypting data by a secure socket layer (SSL)).

As discussed in Japanese Patent Application Laid-Open No. 2009-140163, when an external device on a network requests processing to an application operating on an HTTPS server, the application operating on the HTTPS server generates not only the session ID but also an identifier referred to as a secure session ID. The secure session ID is the identifier to be used in communication with encryption. The application operating on the HTTPS server transmits, to the external device, the session ID and the secure session ID together with the processing result in response to the processing request.

When requesting again processing to the application operating on the HTTPS server, the external device transmits the processing request together with the session ID and the secure session ID received from the MFP.

However, when loading the application operating on the HTTP server and the application operating on the HTTPS server, the MFP uses identifiers varied according to the application. Therefore, different identifiers need to be managed in response to even a request from the same external device.

SUMMARY OF THE INVENTION

According to an aspect of the present invention, an information processing apparatus capable of communicating with an external device includes a first processing unit, a second processing unit, a reception unit configured to receive a processing request for requesting processing to any of the first processing unit and the second processing unit from the external device, a generation unit configured to generate, if a processing request for requesting processing to the first processing unit is received from the external device, a first identifier for identifying the external device by the first processing unit and further generate a second identifier for identifying the external device by the second processing unit, a storage unit configured to store the first identifier and the second identifier generated by the generation unit in association with each other, and a transmission unit configured to transmit the first identifier generated by the generation unit if the first processing unit performs the processing in response to the received processing request, wherein, if the reception unit receives a processing request which is for requesting processing to the second processing unit and includes the first identifier, the second processing unit identifies the external device by the first and second identifiers stored in the storage unit and the first identifier included in the processing request.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 (including FIGS. 7A and 7B) illustrates a flowchart of processing executed by a Box To Print servlet according to the present exemplary embodiment.

DESCRIPTION OF THE EMBODIMENTS

Various exemplary embodiments, features, and aspects of the invention will be described in detail below with reference to the drawings.

Figure 1:
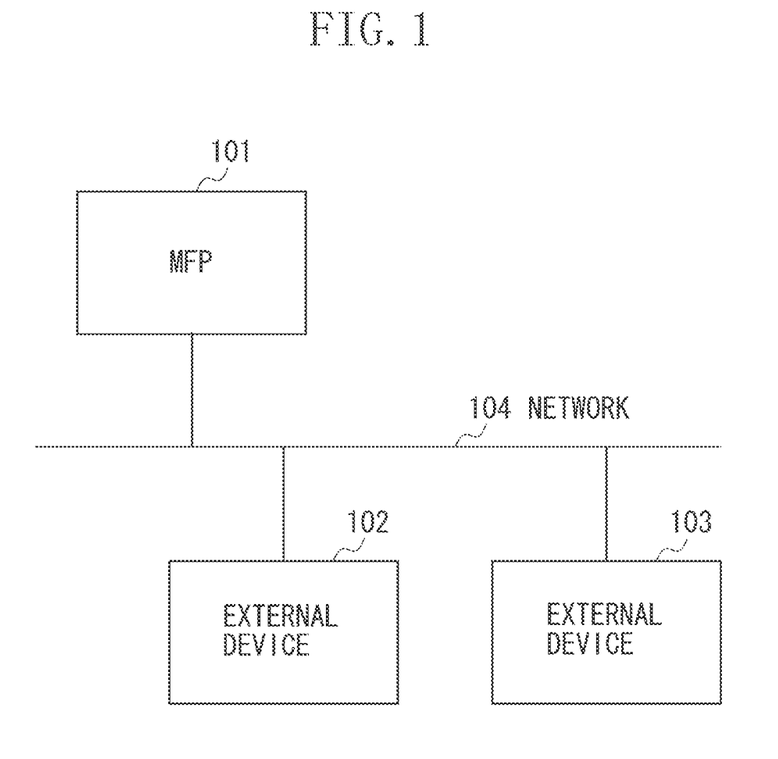
FIG. 1 illustrates a system configuration of an information processing system including an MFP and an external device according to an exemplary embodiment.

A description is given of a system configuration of an information processing system including a multifunction peripheral (MFP) and a plurality of external devices according to an exemplary embodiment of the present invention with reference to FIG. 1.

The information processing system according to the present exemplary embodiment includes an MFP 101 and external devices 102 and 103. The MFP 101 and the external devices 102 and 103 are connected to a network 104 to be mutually communicable with each other. According to the present exemplary embodiment, a device example is given of using an image forming apparatus (information processing apparatus), such as an MFP, a printer, a facsimile machine, a copying machine, or the like.

The MFP 101 includes a plurality of functions, e.g., a scan function, a facsimile function, a print function, an email function, a web browser function, and a web server function. According to the present exemplary embodiment, the MFP 101 includes the web server function to perform processing according to a request from a web browser of the external device 102 or 103 or a dedicated web client and return the processing result.

When the web browser requests to view a status of the MFP 101, status information about the MFP 101 is obtained and the obtained result is transmitted to the web browser. When the web browser requests network setting of the MFP 101, the network can be set according to a parameter included in the request.

The MFP 101 has the web server function to provide the scan function or the print function of the MFP 101 as a web service. More specifically, the MFP 101 can execute scan processing, print processing, and network transmission processing in response to a request from the web browser or another dedicated HTTP client.

Although the number of the MFP 101 is one in FIG. 1, a plurality of the MFPs 101 may be connected to the network 104.

The external device 102 includes a web browser to request processing to a web application of the MFP 101 via the network 104. The external device 102 is a personal computer (PC), a mobile phone, or the like. The external device 102 may be another MFP having a web browser function.

Figure 2:
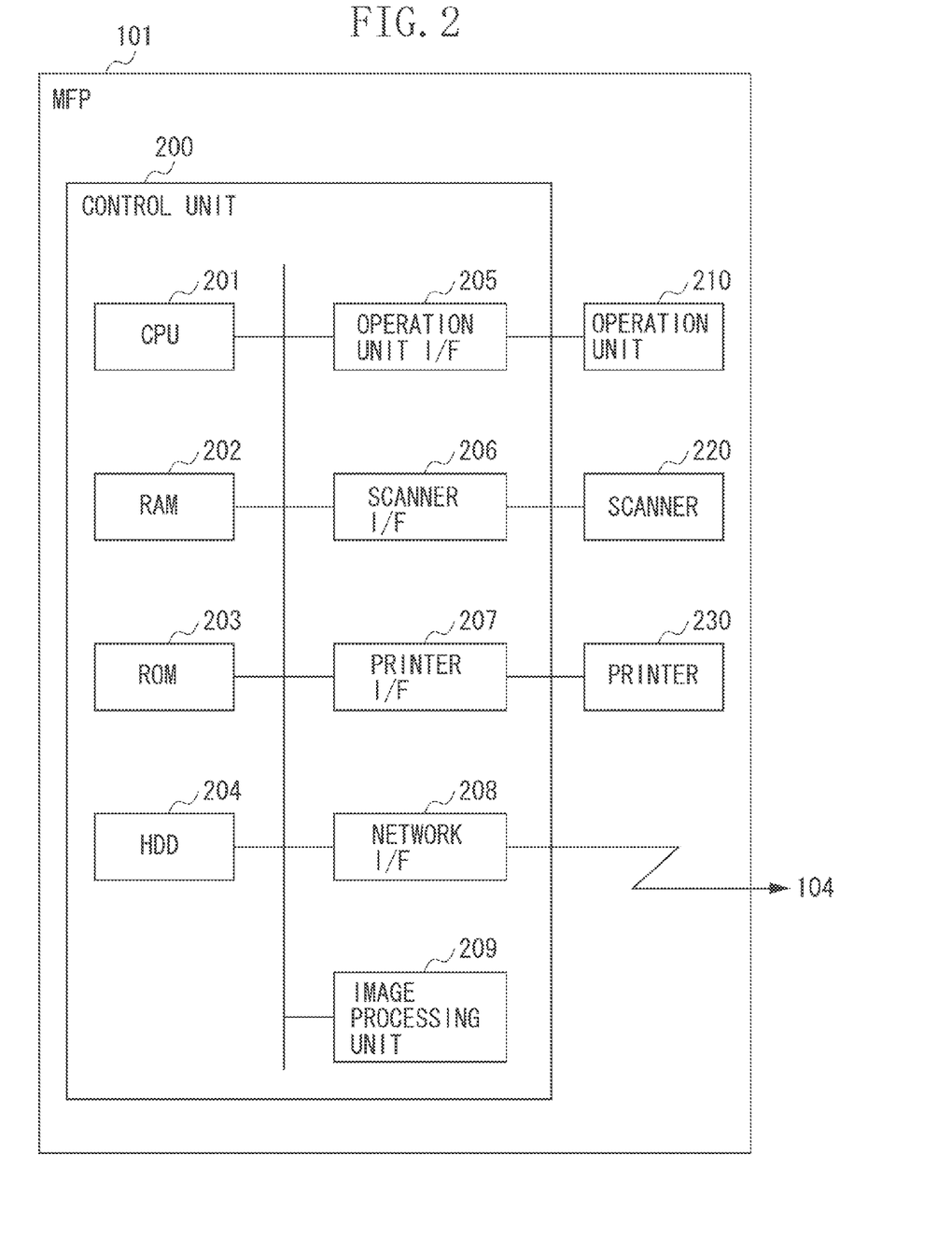
FIG. 2 illustrates a block diagram illustrating a hardware configuration of the MFP according to the present exemplary embodiment.

A description is given of a hardware configuration of the MFP 101 in FIG. 1 with reference to FIG. 2. The MFP 101 includes a control unit 200, an operation unit 210, a scanner 220, and a printer 230.

The control unit 200 controls the MFP 101. The control unit 200 includes a central processing unit (CPU) 201, a random access memory (RAM) 202, a read-only memory (ROM) 203, a hard disk drive (HDD) 204, an operation unit interface (I/F) 205, a scanner I/F 206, a printer I/F 207, a network I/F 208, and an image processing unit 209. The components included in the control unit 200 are mutually connected by a system bus.

The CPU 201 is an arithmetic operation unit that controls the entire MFP 101. The RAM 202 is a system working memory for operating the CPU 201, and is also an image memory for temporarily storing image data. An operating system (OS), system software, and an application program are loaded to the RAM 202.

The HDD 204 stores the OS, the system software, the application program, and the image data.

The operation unit I/F 205 is connected to the operation unit 210. The operation unit 210 is integrated with a display device such as a touch panel for indicating a status of the MFP 101 and operation buttons for issuing an instruction to the MFP 101.

The scanner I/F 206 connects the scanner 220 as an image input device to the control unit 200, thereby inputting image data. The RAM 202 or the HDD 204 stores the image data input from the scanner 220 via the scanner I/F 206. The stored image data is subjected to image processing by the application program loaded to the RAM 202 or the image processing unit 209 if necessary.

The printer I/F 207 connects the printer 230 as an image output device to the control unit 200, thereby outputting the image data. The image data stored in the RAM 202 or the HDD 204 is output to the printer 230 via the printer I/F 207, and an image is printed by the printer 230.

The network I/F 208 is connected to a local area network (LAN) to input or output the image data or information for controlling the MFP 101.

The image processing unit 209 performs processing including image processing, image rotation, image compression, resolution conversion, color space conversion, and gradation conversion of data input from the scanner 220 or data to be output to the printer 230.

Although not illustrated in FIG. 2, the MFP 101 includes a facsimile (FAX) function for FAX transmission with an interface for a modem device between the control unit 200 and the modem device via a public line.

Figure 3:
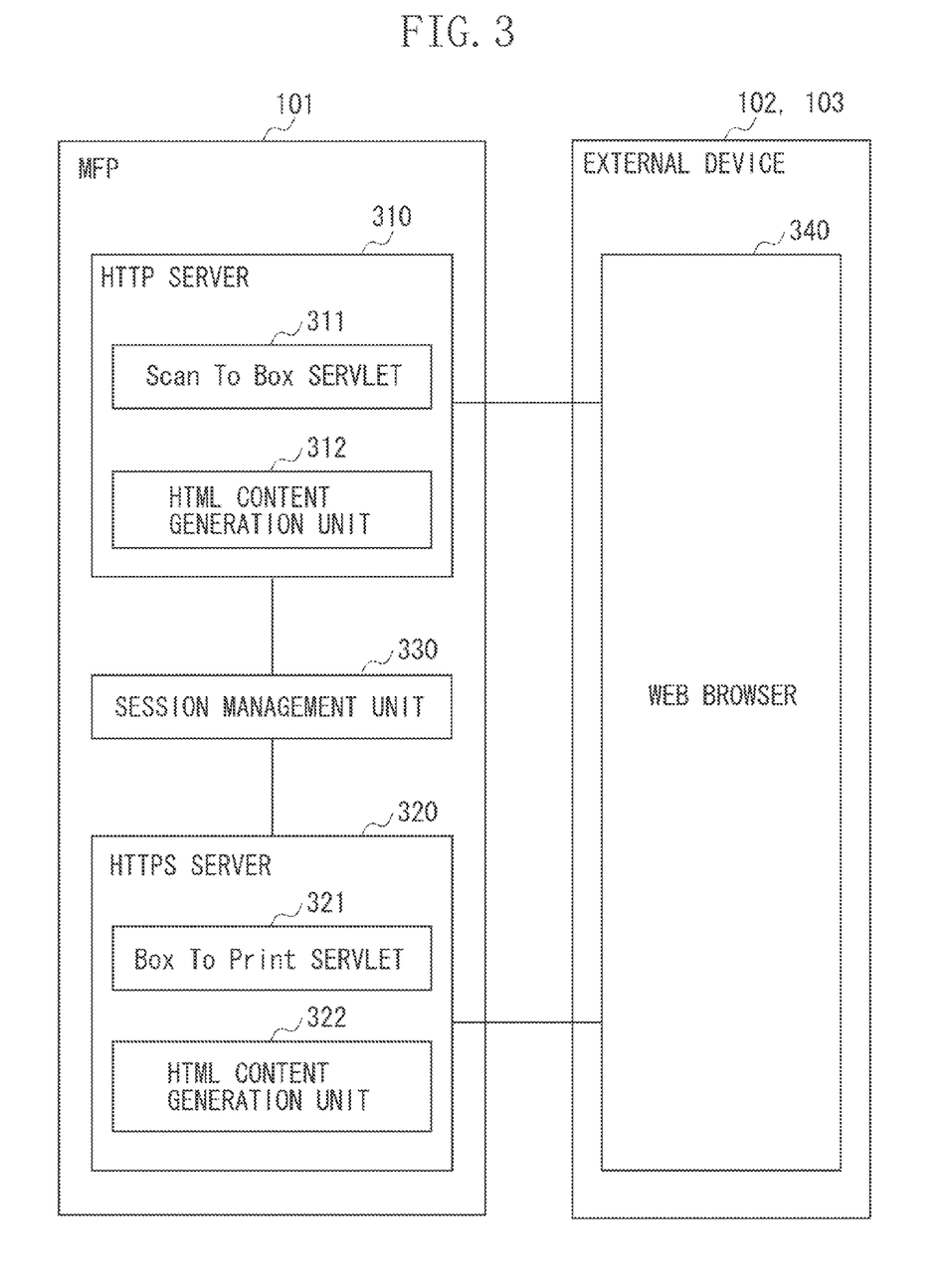
FIG. 3 illustrates a software configuration of the MFP according to the present exemplary embodiment.

A description is given of a software configuration of the MFP 101 and the external devices 102 and 103 with reference to FIG. 3. The MFP 101 includes a hypertext transfer protocol (HTTP) server 310, a hypertext transfer protocol secure (HTTPS) server 320, and a session management unit 330. The CPU 201 loads the program stored in the ROM 203 or the HDD 204 to the RAM 202 and executes the program, so that functions of the HTTP server 310, the HTTPS server 320, and the session management unit 330 can be realized.

A web browser 340 provided for the external devices 102 and 103 is generally used for, e.g., a personal computer (PC). The web browser 340 displays hypertext markup language (HTML) contents obtained by accessing the HTTP server 310 or the HTTPS server 320 on a display device (not illustrated) of the external device 102. The HTML contents are data described by the HTML. The external device 103 includes a function similar to the external device 102.

The external devices 102 and 103 may include a dedicated application developed to communicate with the HTTP server 310 or the HTTPS server 320 in the MFP 101, in place of the web browsers generally used for the PC.

The HTTP server 310 in the MFP 101 is a web service program for displaying the HTML contents or providing another service in response to the request from the web browser 340. The HTTPS server 320 is a web service program for encrypting the communication, preventing data falsification, and authenticating a communication partner by integrating a secure socket layer (SSL) to the HTTP server 310.

A Scan To Box servlet 311 is a web application (servlet) communicable with the web browser 340. The Scan To Box servlet 311 operates on the HTTP server 310. The Scan To Box servlet 311 further executes processing (first processing) for storing image data generated by scanning a document by the scanner 220 to a predetermined storage region, which is referred to as a box, of the HDD 204.

The Scan To Box servlet 311 is called according to a request (hereinafter, referred to as an HTTP request) according to an HTTP from the external device 102 or 103, and is then operated. The HTTP request received by the Scan To Box servlet 311 corresponds to a first processing request. The Scan To Box servlet 311 is called based on a uniform resource locator (URL) included in the HTTP request received from the web browser 340.

The URL is described in a form of "http://IP address of the MFP 101: port number of the HTTP server 310 (80th port according to the present exemplary embodiment)/path of the Scan To Box servlet 311". In other words, when the MFP 101 receives the HTTP request including the URL, the HTTP server 310 allocated to the 80th port calls the Scan To Box servlet 311.

The Scan To Box servlet 311 further executes a job according to the HTTP request from the web browser 340, and transmits an execution result of the job as a response (hereinafter, referred to as an HTTP response) of the HTTP to the web browser 340. The transmitted HTTP response includes, as a description, information indicating that the job has normally ended or information indicating that an error occurs during the execution.

A Box To Print servlet 321 is communicable with the web browser 340, and is a web application (servlet) operating on the HTTPS server 320. The Box To Print servlet 321 executes processing (second processing) for printing an image stored in the box. The Box To Print servlet 321 further operates with a call from the HTTPS server 320.

The Box To Print servlet 321 is called by the URL included in the HTTP request. The URL is described in a form of "https://IP address of the MFP 101: port number of the HTTPS server 320 (443rd port according to the present exemplary embodiment)/path of the Scan To Box servlet 311".

The SSL enables the encryption of the HTTP request and the HTTP response transmitted or received between the Box To Print servlet 321 and the web browser 340. The HTTP request received by the Box To Print servlet 321 corresponds to a second processing request.

HTML content generation units 312 and 322 transmit the HTML contents generated in response to the HTTP request from the web browser 340 thereto.

The session management unit 330 is a Cookie, and manages an identifier (hereinafter, referred to as session information) for identifying communication statuses between the web browser 340 and the HTTP server 310, and the web browser 340 and the HTTPS server 320. The session information is used as an identifier indicating that the authentication of the web browser 340 is successful. Further, the session information is generated when the communication with the web browser 340 is started, and is stored to a session table described below.

The session management unit 330 further stores retention time for retaining the session information managed by the session table. According to the present exemplary embodiment, the retention time is thirty minutes. The session management unit 330 checks whether the time difference is thirty minutes or more between the current time and the last time (used date) when the session information is used (referred) by the HTTP server 310 or HTTPS server 320. When the session management unit 330 determines that the time difference is thirty minutes or more between the current time and the time when the session information is referred, the session management unit 330 deletes the session information.

Figure 4:
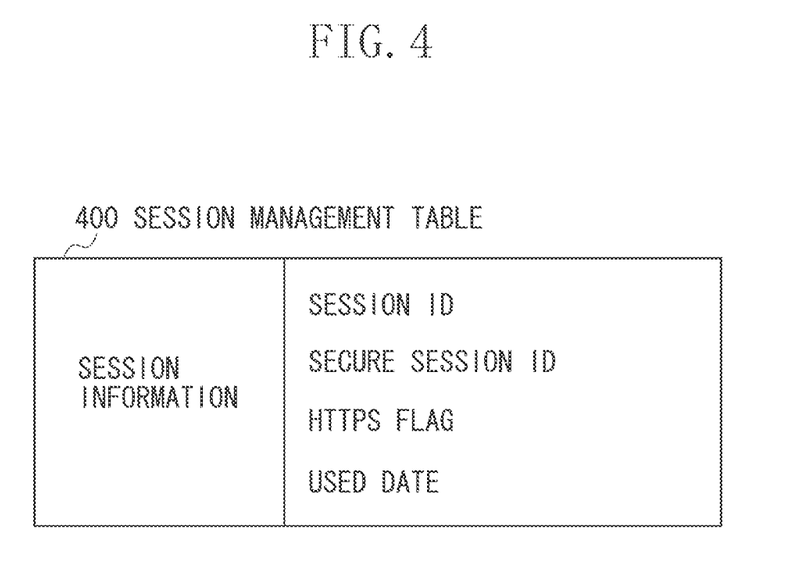
FIG. 4 illustrates an example of a session table managed by a session management unit according to the present exemplary embodiment.

FIG. 4 illustrates an example of the session table managed by the session management unit 330 according to the present exemplary embodiment.

The session management table stores a plurality of pieces of the session information illustrated in FIG. 4. The session information includes, as attributes, a session identification (ID), a secure session ID, an HTTP flag, and a value of the used date. In the session management table, the session ID (a first identifier) and the secure session ID (a second identifier) are stored in association with each other.

The session ID is an identifier for identifying the external device 102 communicated with the Scan To Box servlet 311. The session ID corresponds to the first identifier. The session ID can be referred to in the communication with the Box To Print servlet 321.

The secure session ID is an identifier for identifying the web browser 340 communicated with the Box To Print servlet 321. The secure session ID corresponds to the second identifier. The HTTPS flag is set to ON when the web browser 340 specified by the session ID communicates with the HTTPS server 320, and is set to OFF if the web browser 340 has never been communicated with the HTTPS server 320.

The used date indicates the date when the session information is used (referred to). The Scan To Box servlet 311 or the Box To Print servlet 321 obtains the session information from the session table, and updates the used date to the current time. The used date of the session information is updated when the Scan To Box servlet 311 or the Box To Print servlet 321 uses the session information. In other words, even if the Box To Print servlet 321 does not use the session information for thirty minutes or more, when the Scan To Box servlet 311 uses the session information, the session information is continuously stored without being deleted.

Figure 5:
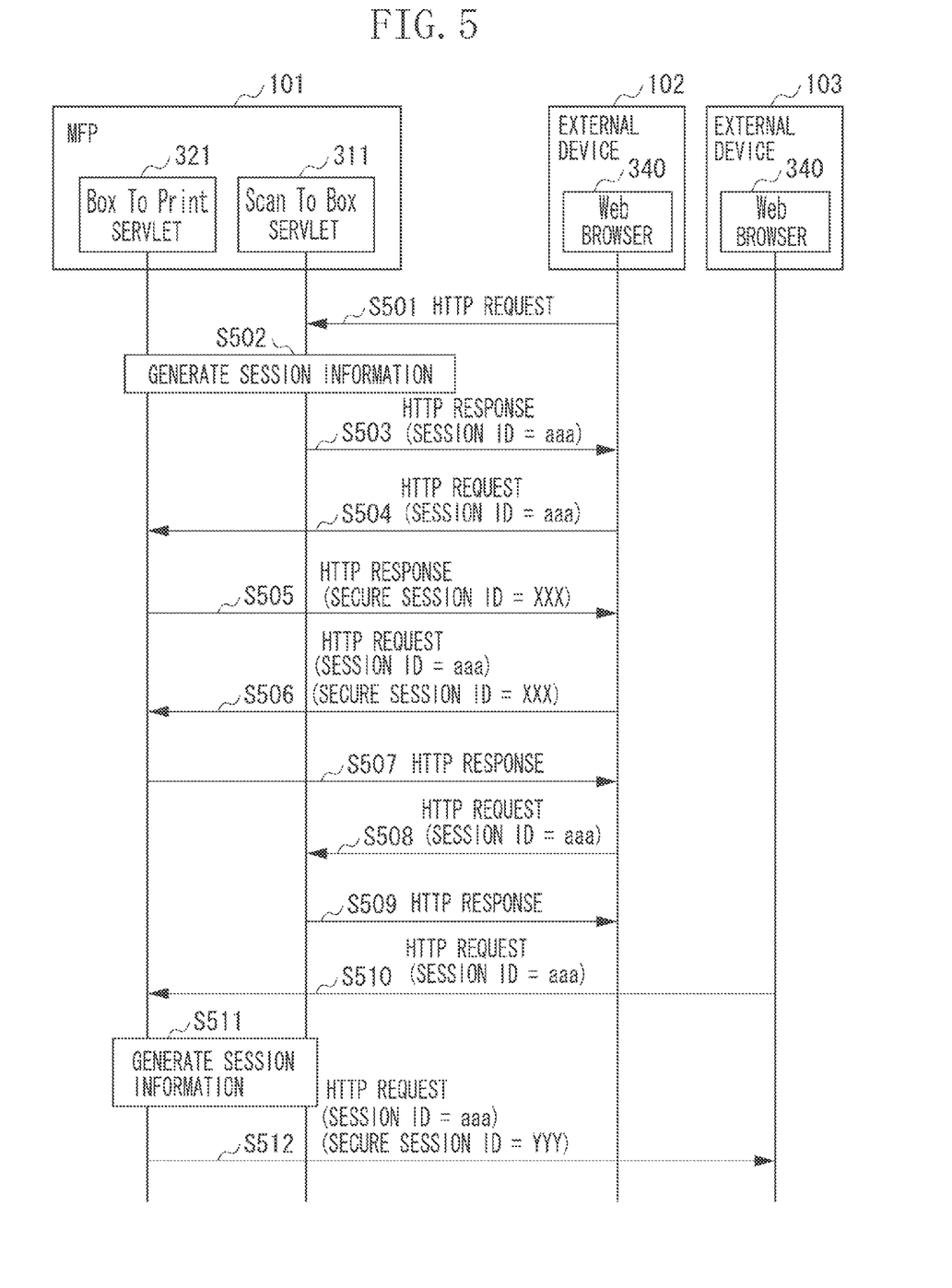
FIG. 5 illustrates a sequence diagram of processing of the MFP and the external devices according to the present exemplary embodiment.

FIG. 5 is a sequence diagram illustrating a processing procedure among the Scan To Box servlet 311, the Box To Print servlet 321, and the web browser 340. The processing procedure in FIG. 5 is realized by executing processing in flowcharts in FIGS. 6 and 7 described below.

Steps S501 to S503 correspond to processing between the Scan To Box servlet 311 in the MFP 101 and the web browser 340 in the external device 102. The encryption with the SSL is not performed in communication in steps S501 to S503. Therefore, another device (e.g., the external device 103) on the network 104 can perform tapping or falsification of data.

In step S501, the web browser 340 transmits a request (HTTP request) based on the HTTP to the Scan To Box servlet 311. The Scan To Box servlet 311 is called by the HTTP server 310 according to the HTTP request received from the web browser 340.

In step S502, the Scan To Box servlet 311 generates new session information (the session ID, the secure session ID, the HTTP flag, and the used date). According to the present exemplary embodiment, the Scan To Box servlet 311 generates not only the session ID used for the communication between the Scan To Box servlet 311 and the web browser 340 but also the secure session ID used for the communication with the Box To Print servlet 321 in a lump. The Scan To Box servlet 311 stores the session ID (the first identifier) and the secure session ID (the second identifier) generated in a lump are stored to the session table in association with each other. As a consequence, by generating the session information plural times, the processing load of the CPU 201 is reduced.

The processing for generating the session information in step S502 is performed only when it is determined that there is not valid session information between the web browser 340 and the Scan To Box servlet 311. It is determined whether there is valid session information under a condition, e.g., a condition indicating whether it is the first communication with the web browser 340 or a condition indicating whether the session information is invalid with elapse of a predetermined time (thirty minutes) after the previous communication with the web browser 340. The details are described below with reference to the flowchart in FIG. 6.

The Scan To Box servlet 311 performs Scan To Box processing according to the HTTP request received in step S501, and transmits the HTTP response indicating the processing result to the web browser 340. When transmitting the HTTP response, the Scan To Box servlet 311 obtains the session ID in the session information generated in step S502, and transmits the session ID included in a Cookie header in the HTTP response.

Steps S504 to S507 correspond to processing between the Box To Print servlet 321 in the MFP 101 and the web browser 340 in the external device 102. The HTTP request and the HTTP response received or transmitted in steps S504 to S507 are encrypted by the SSL.

In step S504, the web browser 340 transmits the HTTP request to the Box To Print servlet 321. At this time, the web browser 340 transmits the session ID received in step S503 included in the Cookie header in the HTTP request.

In step S505, the Box To Print servlet 321 executes the Box To Print processing according to the HTTP request received in step S504. More specifically, the Box To Print servlet 321 generates a preview image of the image data obtained from the HDD 204 to allow a user who operates the external device 102 to check an image as a print target. Further, the Box To Print servlet 321 transmits the generated preview image as the HTTP response to the web browser 340. At this time, the Box To Print servlet 321 transmits the secure session ID included in the header of the HTTP response.

In step S505, the Box To Print servlet 321 transmits the secure session ID when the web browser 340 first accesses the Box To Print servlet 321 or when a predetermined time (thirty minutes) elapses after the previous communication with the web browser 340.

In step S506, the web browser 340 transmits the HTTP request to the Box To Print servlet 321. At this time, the web browser 340 obtains the session ID included in the HTTP response received in step S503 and the secure session ID included in the HTTP response received in step S505. Further, the web browser 340 transmits the obtained session ID and secure session ID included in the header of the HTTP request.

In step S507, the Box To Print servlet 321 executes the subsequent Box To Print processing based on the HTTP request received in step S506. More specifically, when the HTTP request indicates printing of the image data corresponding to the preview image, the Box To Print servlet 321 performs printing of the image based on the image data stored in the HDD 204. Further, the Box To Print servlet 321 transmits the processing result as the HTTP response to the web browser 340.

Steps S508 to S509 correspond to processing for accessing again the Scan To Box servlet 311 by the web browser 340 accessed in step S501.

In step S508, the web browser 340 transmits the HTTP request including the session ID received in step S503 to the Scan To Box servlet 311. In step S509, the Scan To Box servlet 311 executes the Scan To Box processing based on the HTTP request received in step S508, and transmits the processing result as the HTTP response. In step S509, the Scan To Box servlet 311 transmits the processing result without including the session information in the header of the HTTP response.

Steps S510 to S512 correspond to processing between the web browser 340 of the other external device 103 and the Box To Print servlet 321.

In step S510, the web browser 340 of the other external device 103 transmits an HTTP request to the Box To Print servlet 321. It is assumed that the transmitted HTTP request includes the session ID received by the external device 102 in step S502. For example, the external device 103 can tap the communication in step S502 to obtain the session ID.

In step S511, the Box To Print servlet 321 determines that the HTTP request is from the other external device 103, and generates new session information (session ID, secure session ID, HTTP flag, and used date).

In step S512, the Box To Print servlet 321 obtains the session ID and the secure session ID in the session information generated in S511, and transmits the obtained session ID and secure session ID together with the result of the Box To Print processing to the web browser 340.

According to the present exemplary embodiment, the session information pieces of the Scan to Box servlet 311 and the web browser 340 can be managed by the session ID. On the other hand, in the communication between the Box To Print servlet 321 and the web browser 340, the session information is managed by the secure session ID and the session ID because of executing the data encryption with the SSL. According to the present exemplary embodiment, even if different identifiers need to be managed by a plurality of servlets, if the request is from the same web browser, the management of the identifiers can be unified as common session information.

According to the present exemplary embodiment, in step S501, if the Scan To Box servlet 311 receives the HTTP request, then, the session ID and the secure session ID are generated as the session information in a lump. Thus, in step S504, the HTTP request is transmitted to the Box To Print servlet 321 after step S501, the secure session ID may not be generated. Advantageously, the processing load of the CPU 201 can be reduced by generating the session information in a lump at the first request time in step S501.

Figure 6:
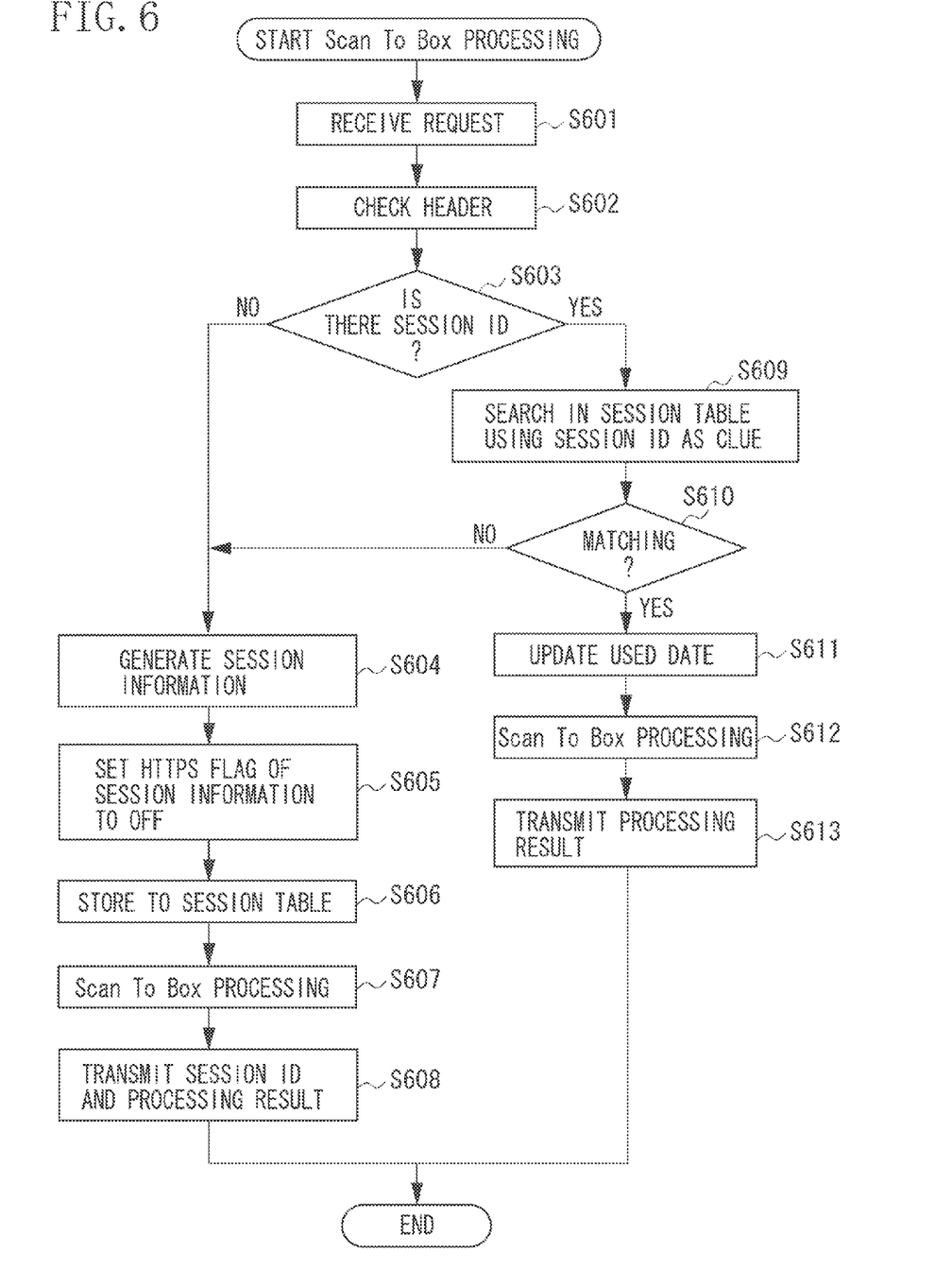
FIG. 6 illustrates a flowchart of processing executed by a Scan To Box servlet according to the present exemplary embodiment.

A description is given of the Scan To Box processing executed by the Scan To Box servlet 311 according to the present exemplary embodiment with reference to FIG. 6. A program for executing each step in the flowchart in FIG. 6 is stored in the ROM 203 or the HDD 204 in the MFP 101, is loaded to the RAM 202, and is executed by the CPU 201.

The processing in the flowchart in FIG. 6 is started with an instruction of the Scan To Box processing to the MFP 101 from a user who operates the external device 102 or 103. When instructing the Scan To Box processing, the user designates scan resolution of the document, a box storage destination of the read image, and a file name to be set to a stored image on an operation screen displayed by the web browser 340 to instruct the execution of scan.

In step S601, the Scan To Box servlet 311 receives the HTTP request from the web browser 340. The Cookie header in the HTTP request can include the session ID.

In step S602, the Scan To Box servlet 311 checks the Cookie header in the HTTP request. In step S603, when the Scan To Box servlet 311 determines that the Cookie header includes the session ID (YES in step S603), the processing proceeds to step S609. When the Scan To Box servlet 311 determines that the Cookie header does not include the session ID (NO in step S603), the processing proceeds to step S604.

In step S604, the Scan To Box servlet 311 generates the session information (the session ID, the secure session ID, the HTTP flag, and the information about the used date). In addition, the Scan To Box servlet 311 may generate an identifier for identifying the user or setting specifically used by the servlet.

In step S605, the Scan To Box servlet 311 sets the HTTP flag generated in step S604 to OFF.

In step S606, the Scan To Box servlet 311 stores the session information generated and set in steps S604 and S605 to the session table in the session management unit 330. The session information stored in the session table is temporarily stored to the RAM 202.

In step S607, the Scan To Box servlet 311 executes the Scan To Box processing according to the HTTP request received in step S601. The HTTP request includes the scan resolution, the box storage destination, and the file name set to an image to be stored in the box. The Scan To Box servlet 311 stores the image data read by the scanner 220 to the HDD 204 according to the information included in the HTTP request.

In step S608, the Scan To Box servlet 311 transmits the session ID generated in step S604 and the execution result (information indicating the success or failure) in step S607 as the HTTP response. Then, the processing in the flowchart ends.

On the other hand, when the Scan To Box servlet 311 determines that the Cookie header in the HTTP request includes the session ID (YES in step S603), the Scan To Box servlet 311 performs the processing in step S609. In step S609, the Scan To Box servlet 311 searches the session table managed by the session management unit 330 for the session information using the session ID of the Cookie header as a clue.

In step S610, as a result of search, when the Scan To Box servlet 311 determines that there is the session information including the session ID matching with the session ID of the Cookie header in the session table (YES in step S610), the processing proceeds to step S611. When the Scan To Box servlet 311 determines that there is no session information including the session ID matching with the session ID of the Cookie header in the session table (NO in step S610), the processing proceeds to step S604.

In step S611, the Scan To Box servlet 311 specifies the matching session information determined in step S610, and updates the used date of the specified session information. More specifically, the Scan To Box servlet 311 sets the current time obtained by an inner timer (not illustrated) of the MFP 101 to the used date, and stores the set used date to the session table in FIG. 4.

In step S612, the Scan To Box servlet 311 executes the Scan To Box processing. More specifically, the Scan To Box servlet 311 stores the image data read by the scanner 220 to the HDD 204 according to the HTTP request received in step S601.

In step S613, the Scan To Box servlet 311 transmits the execution result (information indicating the success or failure) in step S612 as the HTTP response to the web browser 340. Then, the processing in the flowchart ends. In step S613, the Scan To Box servlet 311 does not transmit the session ID.

Figures 7, 7A:
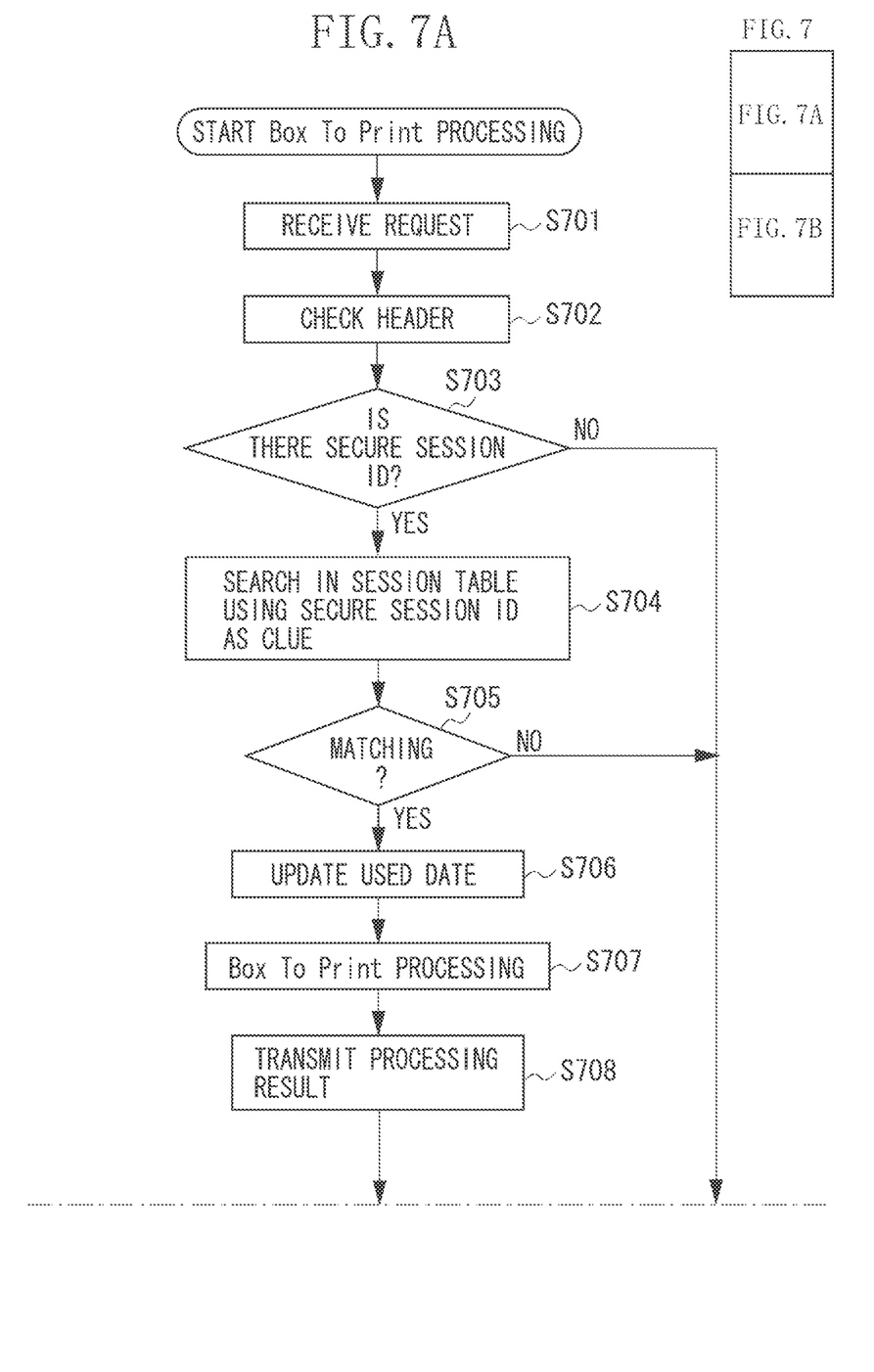
Figure 7B:
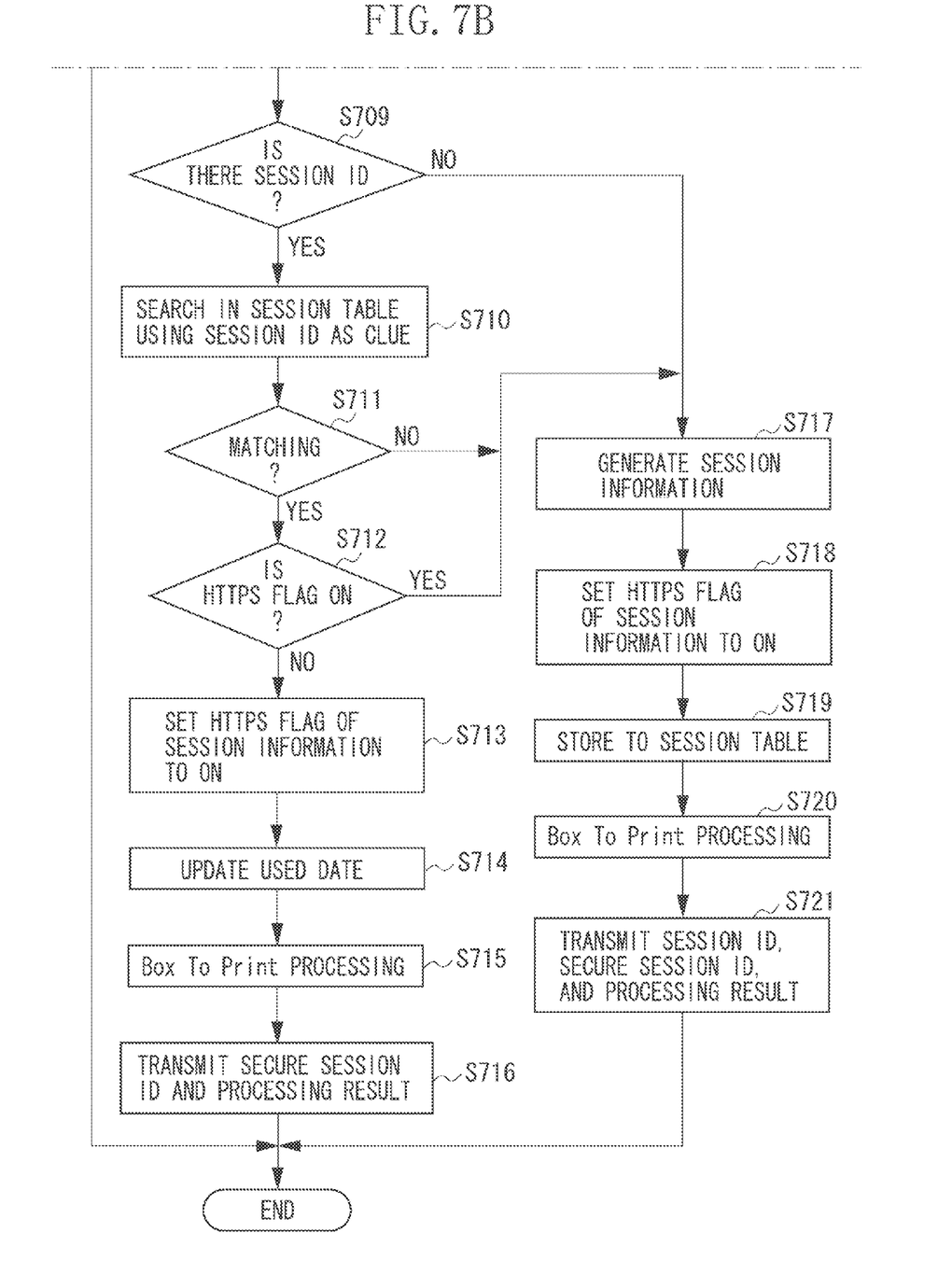

A description is given of the Box To Print processing of the Box To Print servlet 321 according to the present exemplary embodiment with reference to FIG. 7 (including FIGS. 7A and 7B). A program for executing each step in the flowchart in FIGS. 7A and 7B is stored in the ROM 203 or the HDD 204 in the MFP 101, is loaded to the RAM 202, and is executed by the CPU 201.

The processing in the flowchart in FIGS. 7A and 7B is started with an instruction of the Box To Print processing on the web browser 340 in the external device 102 or 103 from the user. When instructing the Box To Print processing on the web browser 304, the user instructs printing by designating a storage location of the image data as a print target, whether data is previewed before printing, and various print settings on the operation screen of the web browser 340.

In step S701, the Box To Print servlet 321 receives the HTTP request from the web browser 340.

In step S702, the Box To Print servlet 321 checks the Cookie header in the HTTP request. In step S703, when the Box To Print servlet 321 determines that the Cookie header includes the secure session ID (YES in step S703), the processing proceeds to step S704. When the Box To Print servlet 321 determines that the Cookie header does not include the secure session ID (NO in step S703), the processing proceeds to step S709.

In step S704, the Box To Print servlet 321 searches the session table managed by the session management unit 330 for the session information using the secure session ID in the Cookie header as a clue.

In step S705, as a result of search, when the Box To Print servlet 321 determines that there is the session information including the secure session ID matching with the secure session ID of the Cookie header in the session table (YES in step S705), the processing proceeds to step S706. When the Box To Print servlet 321 determines that there is no session information including the secure session ID matching with the secure session ID of the Cookie header in the session table (NO in step S705), the processing proceeds to step S709.

In step S705, it is determined as "YES" when the Cookie header included in the HTTP request received in step S701 includes the secure session ID managed by the session table. In this case, the request is determined as that from the web browser 340 that once transmitted the secure session ID by the SSL communication. Then, the processing proceeds to step S706 or subsequent step.

In step S706, the Box To Print servlet 321 specifies the matching session information determined in step S705, and updates the used date of the specified session information.

In step S707, the Box To Print servlet 321 executes the Box To Print processing according to the HTTP request received in step S701. More specifically, printing is performed based on the information about the storage location of the image data as the print target, whether the preview is performed before printing, and various print settings, which are included in the HTTP request received in step S701.

In step S708, the Box To Print servlet 321 transmits the execution result (information indicating the success or failure) in step S708 as the HTTP response to the web browser 340. Then, the processing in the flowchart ends.

When the HTTP request received in step S701 designates the preview, in step S707, the image data stored in the HDD 204 is obtained and the image processing unit 209 generates a preview image. In step S708, the image processing unit 209 transmits the preview image as the HTTP response to the web browser 340. The processing in steps S701 to S706 are performed by receiving again the HTTP request for instructing the print execution based on the preview image from the web browser 340. Then in step S707, the Box To Print servlet 321 executes the subsequent Box To Print processing.

On the other hand, when the Cookie header in the HTTP request does not include the secure session ID (NO in step S703), the Box To Print servlet 321 executes the processing in step S709. In step S709, the Box To Print servlet 321 determines whether the Cookie header in the HTTP request includes the session ID. When the Cookie header includes the session ID (YES in step S709), the processing proceeds to step S710. When the Cookie header does not include the session ID (NO in step S709), the processing proceeds to step S717.

In step S710, the Box To Print servlet 321 searches the session table managed by the session management unit 330 for the session information using the session ID of the Cookie header as a clue.

In step S711, as a result of search, when the Box To Print servlet 321 determines that there is the session information including the session ID matching with the session ID of the Cookie header in the session table (YES in step S711), the processing proceeds to step S712. When the Box To Print servlet 321 determines that there is no session information including the session ID matching with the session ID of the Cookie header in the session table (NO in step S711), the processing proceeds to step S717.

In step S712, the Box To Print servlet 321 specifies the matching session information determined in step S711, and determines whether the HTTPS flag of the specified session information is ON or OFF. When the Box To Print servlet 321 determines that the HTTPS flag is OFF (NO in step S712), the processing proceeds to step S713.

In step S712, it is determined as "NO" when the Cookie header included in the HTTP request received in step S701 includes the session ID and, however, the HTTPS flag is OFF. In other words, the Box To Print servlet 321 determines that the request is from the web browser 340 that has communicated with the Scan To Box servlet 311 in the past but has not been communicated with the Box To Print servlet 321. Then, the processing proceeds to step S713 or subsequent step.

In step S713, the Box To Print servlet 321 sets the HTTPS flag of the session information specified in step S712 to ON. In step S714, the Box To Print servlet 321 updates the used date of the session information specified in step S712. In step S715, the Box To Print servlet 321 executes the Box To Print processing according to the HTTP request received in step S701.

In step S716, the Box To Print servlet 321 obtains the secure session ID of the session information specified in step S712 from the session table managed by the session management unit 330. The Box To Print servlet 321 transmits the obtained secure session ID and the execution result (information indicating the success or failure) in step S715 as the HTTP response to the web browser 340. Then, the processing in the flowchart ends.

On the other hand, if it is determined that the HTTPS flag is ON (YES in step S712), the Box To Print servlet 321 performs the processing in step S717 or subsequent step. In step S712, it is determined as "YES" when the HTTPS flag is ON and thus the data communication using the SSL once performed between the Box To Print servlet 321 and the web browser 340. In other words, the secure session ID is necessarily transmitted from the Box To Print servlet 321 to the web browser 340.

However, the Cookie header included in the HTTP request received in step S701 includes the session ID but does not include the secure session ID (or the Cookie header includes the secure session ID that does not match the value in the session table). In this case, it can be considered a case where the third party tapped the communication between the web browser 340 and the Scan To Box servlet 311. In order to generate new session information, the processing proceeds to step S717.

In step S717, the Box To Print servlet 321 newly generates the session information (the session ID, the secure session ID, and the HTTPS flag, and the used date). The processing is similar to that in step S604 in FIG. 6.

In step S718, the Box To Print servlet 321 sets the HTTPS flag in the session information generated in step S717 to ON. In step S719, the Box To Print servlet 321 stores the session information generated in step S717 to the session table.

In step S719, the Box To Print servlet 321 executes the Box To Print processing according to the HTTP request received in step S701. In step S721, the Box To Print servlet 321 transmits, to the web browser 340, the session ID and the secure session ID in the session information generated in step S717 together with the execution result. Then, the processing in the flowchart ends.

As described above, according to the present exemplary embodiment, even if the external device needs to be identified with different identifiers by a plurality of servlets, the MFP 101 can recognize the requests from the same web browser.

Further, according to the present exemplary embodiment, the session table stores the session ID for identifying the external device by the Scan To Box servlet and the secure session ID for identifying the external device by the Box To Print servlet in association with each other. As a result, the MFP can unify the management of the session ID and the secure session ID as common session information.

Furthermore, according to the present exemplary embodiment, when the Scan To Box servlet receives the HTTP request, both of the session ID and the secure session ID are generated in a lump. Consequently, when the Box To Print servlet receives the second processing request from the external device that transmits the first processing request to the Scan To Box servlet, the secure session ID may not be generated. More specifically, the session information can be generated in a lump when the first processing request is received, so that the processing load of the CPU can be reduced and the session information is easily managed.

Aspects of the present invention can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-212396 filed Sep. 22, 2010, which is hereby incorporated by reference herein in its entirety.

What is claimed is:

1. A method for controlling an information processing apparatus with a processor that is capable of communicating with an external device, the method comprising:

storing, as session information for external devices, a session identification (ID) used in communication of hypertext transfer protocol (HTTP), a secure session ID used in communication of hypertext transfer protocol secure (HTTPS), and a flag indicating that communication according to HTTPS has been performed;

receiving a first request which is transmitted from an external device, the first request including a session ID;

determining whether the session ID included in the first request corresponds to the session ID included in the stored session information, when it is determined that the session ID included in the first request does not correspond to the session ID included in the stored session information, generating a new session ID and a new secure session ID for the external device, storing the new session ID and the new secure session ID as the session information, and transmitting a response including the new session ID to the external device, wherein the receiving receives a second request which is transmitted from an external device, the second request including a secure session ID or a session ID;

determining whether the secure session ID included in the second request corresponds to the secure session ID stored as the session information, and determining whether the session ID included in the second request corresponds to the session ID stored as the session information, when it is determined that the secure session ID included in the second request does not correspond to the secure session ID stored as the session information and it is determined that the session ID included in the second request corresponds to the session ID stored as the session information, determining whether to transmit a response including the secure session ID which is stored together with the corresponding session ID to the external device which is transmitted the second request or to generate a new secure session ID and a new session ID for the external device which transmitted the second request, based on the flag stored together with the corresponding session ID.

2. A non-transitory computer-readable recording medium storing a program for enabling an information processing apparatus to execute a method comprising:

storing, as session information for external devices, a session identification (ID) used in communication of hypertext transfer protocol (HTTP), a secure session ID used in communication of hypertext transfer protocol secure (HTTPS), and a flag indicating that communication according to HTTPS has been performed;

receiving a first request which is transmitted from an external device, the first request including a session ID;

determining whether the session ID included in the first request corresponds to the session ID included in the stored session information, when it is determined that the session ID included in the first request does not correspond to the session ID included in the stored session information, generating a new session ID and a new secure session ID for the external device, storing the new session ID and the new secure session ID as the session information, and transmitting a response including the new session ID to the external device, wherein the receiving receives a second request which is transmitted from an external device, the second request including a secure session ID or a session ID;

determining whether the secure session ID included in the second request corresponds to the secure session ID stored as the session information, and determining whether the session ID included in the second request corresponds to the session ID stored as the session information, when it is determined that the secure session ID included in the second request does not correspond to the secure session ID stored as the session information and it is determined that the session ID included in the second request corresponds to the session ID stored as the session information, determining whether to transmit a response including the secure session ID which is stored together with the corresponding session ID to the external device which is transmitted the second request or to generate a new secure session ID and a new session ID for the external device which transmitted the second request, based on the flag stored together with the corresponding session ID.

3. An information processing apparatus comprising:

a storage unit configured to store, as session information for external devices, a session identification (ID) used in communication of hypertext transfer protocol (HTTP), a secure session ID used in communication of hypertext transfer protocol secure (HTTPS), and a flag indicating that communication according to HTTPS has been performed;

a reception unit configured to receive a first request which is transmitted from an external device, the first request including a session ID; and a control unit configured to determine whether the session ID included in the first request corresponds to the session ID stored in the storage unit as the session information, when it is determined that the session ID included in the first request does not correspond to the session ID stored in the storage unit as the session information, the control unit generates a new session ID and a new secure session ID for the external device, stores the new session ID and the new secure session ID in the storage unit as the session information, and transmits a response including the new session ID to the external device, wherein the reception unit is configured to receive a second request which is transmitted from an external device, the second request including a secure session ID or a session ID, wherein the control unit is configured to determine whether the secure session ID included in the second request corresponds to the secure session ID stored in the storage unit as the session information, and determine whether the session ID included in the second request corresponds to the session ID stored in the storage unit as the session information, when it is determined that the secure session ID included in the second request does not correspond to the secure session ID stored in the storage unit as the session information and it is determined that the session ID included in the second request corresponds to the session ID stored in the storage unit as the session information, the control unit determines whether to transmit a response including the secure session ID which is stored together with the corresponding session ID to the external device which is transmitted the second request or generates a new secure session ID and a new session ID for the external device which transmitted the second request, based on the flag stored in the storage unit together with the corresponding session ID.

4. The information processing apparatus according to claim 3, wherein the control unit determines whether a session ID included in a request received from an external device according to HTTPS does not match the session ID included in the session information stored in the storage unit, when it is determined that a session ID included in a request received from an external device according to HTTPS does not match the session ID included in the session information stored in the storage unit, the control unit generates session information including a new session ID and a new secure session ID used in communication of HTTP and HTTPS with the external device which has transmitted the request, stores the generated session information in the storage unit, adds the session ID and the secure session ID included in the generated session information to a response corresponding to the request, and transmits the response to the external device according to HTTPS.

5. The information processing apparatus according to claim 3,
wherein the control unit
determines whether a session ID included in a request received from an external device according to HTTP matches the session ID included in the stored session information,
when it is determined that a session ID included in a request received from an external device according to HTTPS matches the session ID included in the session information stored in the storage unit, the control unit transmits a response corresponding to the request to the external device according to HTTP, without generating new session information.

6. The information processing apparatus according to claim 3,
wherein the control unit
determines whether a secure session ID included in a request received from an external device according to HTTPS matches the secure session ID included in the stored session information,
when it is determined that a secure session ID included in a request received from an external device according to HTTPS matches the secure session ID included in the stored session information, the control unit transmits a response corresponding to the request to the external device according to HTTPS, without generating new session information.

7. The information processing apparatus according to claim 3,
wherein the storage unit further stores data information indicating data in which the session ID or the secure session ID is used, and
wherein the control unit determines whether a session ID included in a request received from an external device according to HTTP matches the session ID included in the stored session information or a secure session ID included in a request received from an external device according to HTTPS matches the secure session ID included in the stored session information,
when it is determined that a session ID included in a request received from an external device according to HTTP matches the session ID included in the stored session information or a secure session ID included in a request received from an external device according to HTTPS matches the secure session ID included in the stored session information, the control unit updates the data information stored in the storage unit.

8. The information processing apparatus according to claim 3,
wherein the control unit analyzes a request received from an external apparatus according to HTTP or HTTPS to conform whether a session ID or a secure session ID is included in a cookie header of the request.

9. The information processing apparatus according to claim 3, further comprising a scanning unit configured to scan an original,
wherein the request received from the external device according to HTTP is a request for scanning an original by the scanning unit.

10. The information processing apparatus according to claim 3, further comprising a printing unit configured to print image data,
wherein the request received from an external device according to HTTPS is a request for printing image data by the printing unit.

* * * * *